United States Patent
Lee et al.

(10) Patent No.: US 7,247,176 B2
(45) Date of Patent: Jul. 24, 2007

(54) APPARATUS FOR REMOVING FINE PARTICLES DURING FABRICATION OF A PORTABLE CAMERA MODULE

(75) Inventors: Hyun-Ju Lee, Gyeongsangbuk-do (KR); Yeong-Seop Lee, Gumi-si (KR); Do-Hyung Lee, Daegu (KR); Sang-Ho Kim, Gumi-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 264 days.

(21) Appl. No.: 10/835,635

(22) Filed: Apr. 30, 2004

(65) Prior Publication Data

US 2005/0059266 A1 Mar. 17, 2005

(30) Foreign Application Priority Data

Sep. 17, 2003 (KR) ...................... 10-2003-0064491

(51) Int. Cl.
E04D 13/00 (2006.01)
(52) U.S. Cl. .......................... 29/25.01; 118/45; 118/56; 118/207; 118/216; 118/237; 118/256; 118/504; 438/14; 438/759
(58) Field of Classification Search ............... 118/45, 118/56, 207, 216, 237, 256, 504; 438/14, 438/759; 29/25.01
See application file for complete search history.

(56) References Cited

U.S. PATENT DOCUMENTS 3,438,833 A * 4/1969 Nakano ...................... 156/502
5,820,725 A * 10/1998 Maeda et al. ............... 156/391
6,576,057 B2 * 6/2003 Wensel ....................... 118/301
6,752,896 B2 * 6/2004 Ong et al. ................... 156/344
2003/0079842 A1 * 5/2003 Behnke ...................... 156/582
2003/0190795 A1 * 10/2003 Kawakami .................. 438/462
2004/0009650 A1 * 1/2004 Jeong et al. ................. 438/462
2004/0121514 A1 * 6/2004 Yoo et al. .................... 438/106

* cited by examiner

Primary Examiner—Michelle Estrada
Assistant Examiner—Jarrett Stark
(74) Attorney, Agent, or Firm—Cha & Reiter, LLC

(57) ABSTRACT

An apparatus and a method adapted for shielding and removing fine particles for a portable camera module generated during a portable camera module fabricating process. The portable camera module includes an image sensor and an infrared ray filter. The apparatus includes a tape attaching device for attaching a surface protective tape on a surface of the infrared ray filter so as to prevent fine particles from being attached to the surface of the infrared ray filter, and a tape detaching device movably installed above the surface protective tape in order to detach the surface protective tape having fine particles shielded from the surface of the infrared ray filter. The fine particles are attached to the surface protective tape, which remains shielding the surface of the infrared ray filter during the holder attaching, primary heat treatment, secondary heat treatment, and under filling processes are subsequently carried out. The tape detaching device is moved downward to attach to the surface of the protective tape using vacuum, and is moved upwardly to separate the surface protective tape from the surface of the infrared ray filter, while the vacuum is still being applied.

18 Claims, 5 Drawing Sheets

APPARATUS FOR REMOVING FINE PARTICLES DURING FABRICATION OF A PORTABLE CAMERA MODULE

CLAIM OF PRIORITY

This application claims priority to an application entitled "Apparatus and Method capable of removing fine particles for portable camera module," filed in the Korean Intellectual Property Office on Sep. 17, 2003 and assigned Serial No. 2003-64491, the contents of which are hereby incorporated by reference.

BACKGROUND OF THE INVENTION

1. Field of the Invention

The present invention relates to an apparatus and a method adapted for removing fine particles from a portable camera module. More particularly, the present invention relates to an apparatus and a method for shielding and removing fine particles generated when fabricating a portable camera module.

2. Description of the Related Art

In general, portable communication devices are appliances that permit a user to engage in wireless communication with other users. Such portable communication devices include HHP, CT-2 cellular phones, digital phones, PCS phones and PDA, which are classified into various types depending on external appearances thereof. For instance, wireless terminals are classified into bar-type, flip-type or folder-type wireless terminals depending on the external appearance thereof.

In addition, in order to achieve wireless communications that include images, a conventional portable communication device includes a camera lens module having a camera lens, so that a user can transmit an image to/from other users, or use the device as a camera, by photographing objects through the camera lens module.

Recently, flip-type terminals or folder-type terminals are mainly used as portable communication devices for at least one of voice communication or visual communication (images). That is, in addition to voice and character transmission functions, the portable communication device has been changed into a high-functional composite appliance equipped with a camera capable of photographing, storing and transmitting an image or a series of images. However, although an image from the camera module is advanced into a mega-pixel image for storage and/or transmission, there are several problems in fabricating the camera module.

The main problem is how to treat fine particles that are attached to an image sensor and an infrared ray filter lens of the camera module of the communications device. There is a particular problem regarding fine particles that attach to an upper surface of an infrared ray filter during a camera module fabricating process. In other words, the infrared ray filter has a structure allowing fine particles to be attached thereto, particularly during construction. An exemplary image sensor is a CMOS image sensor 1 shown in FIG. 1. The CMOS image sensor 1 is a switch-type device capable of sequentially detecting outputs using MOS transistors, which are fabricated corresponding to the number of pixels through a CMOS technique utilizing a control circuit and a signal processing circuit as peripheral circuits. The CMOS sensor 1 is operated at low power consumption levels, so it is adaptable for a personal portable device, such as a portable cellular phone, that is limited in available power.

Hereinafter, a process for fabricating the CMOS image sensor 1 and an infrared ray filter 2 will be described.

As shown in FIG. 1, the infrared ray filter 2 is mechanically processed in a COF (chip on film) process. Subsequent to the mechanical processing, a surface protective tape 3 is attached to the infrared ray filter 2 using a tape attaching/detaching device (not shown) in order to prevent fine particles from being attached to the infrared ray filter 2.

The surface protective tape 3 is detached from the infrared ray filter 2 by means of the tape attaching/detaching device when performing a holder attaching process. Then, adhesive is applied to a contact surface of the infrared ray filter 2 and a contact surface of Flexible Printed Circuit Board (FPCB) 4 provided at an upper portion thereof with a connector 5 in order to attach the FPCB 4 to an upper portion of the infrared ray filter 2. As shown in FIG. 2, after bonding the contact surface of the infrared ray filter 2 to the contact surface of the FPCB 4, a holder 6 is attached to the contact surface of the FPCB 4 in such a manner that the infrared ray filter 2 is arranged within the holder 6. Then, a primary heat-treatment process is carried out in an oven (not shown) with a high temperature.

Subsequent to the primary heat-treatment process, as shown in FIG. 3, after attaching the image sensor 1 to a lower portion of the FPCB 4, an under filling work is carried out with respect to both lateral portions of the image sensor 1 in order to prevent the image sensor 1 from being separated from the FPCB 4. In this state, a secondary heat-treatment process is carried out in the oven with a high temperature. Then, fine particles 7 detected by the image sensor 1 are inspected through a monitor (not shown) of a test tool kit. In other words, before the holder 6 attaching work is carried out, the surface protective tape 3 is attached to the infrared ray filter 2 so as to prevent fine particles 7 from being attached to the infrared ray filter 2 (as shown in FIG. 1).

However, according to the conventional method of construction, it is necessary to separate the surface protective tape 3 from the infrared ray filter 2 when performing the holder attaching process of holder 6. Accordingly, the infrared ray filter 2 is exposed to an atmosphere when performing a banding work during the holder attaching process and when performing the heat-treatment process. In addition, it is required to perform the under filling and mechanical processing works with respect to the lateral portion of the image sensor in order to protect the image sensor. Fine particles (5–10 um) are introduced into the image sensor 1 and the infrared ray filter 2 from the atmosphere while the above processes are being carried out, thereby lowering the quality of images received by the camera module.

SUMMARY OF THE INVENTION

Accordingly, the present invention has been made to solve at least some of the above-mentioned problems and provides additional advantages by providing an apparatus and a method adapted for removing fine particles from an image sensor and an infrared ray filter of a portable camera module. The apparatus attaches a surface protective tape to an infrared ray filter using a tape attaching device at a first step of a portable camera module fabricating process, and detaches the surface protective tape from the infrared ray filter using a tape detaching device at a final step of the portable camera module fabricating process, thereby shielding the image sensor and removing fine particles generated during the portable camera module fabricating process, so as to improve image quality of the portable camera module.

Another aspect of the present invention is to provide an apparatus and a method adapted for reducing faulty images in a portable camera module by completely shielding fine particles attached to a surface of an infrared ray filter from exposure in a clean room and an oven during a portable camera module fabricating process by attaching a surface protective tape to the infrared ray filter using a tape attaching device at a first step of the portable camera module fabricating process and detaching the surface protective tape from the infrared ray filter using a tape detaching device at a final step of the portable camera module fabricating process.

In one aspect, there is provided an apparatus for removing fine particles for a portable camera module having a CMOS image sensor and an infrared ray filter, the apparatus comprising: a tape attaching device for attaching a surface protective tape on a surface of the infrared ray filter, the protective tape preventing fine particles from being attached to the surface of the infrared ray filter; and a tape detaching device movably installed above the surface protective tape in order to detach the surface protective tape having accumulated fine particles on the tape while protecting the surface of the infrared ray filter, the fine particles being attached to the surface protective tape. The protective tape remains attached to the infrared ray filter during the holder attaching step, primary and secondary heat treatment steps, and under filling process steps in the fabrication of the invention. As the aforementioned steps are being carried out, the tape detaching device is moved downward in order to suck the surface protective tape using vacuum pressure and upward in order to separate the surface protective tape from the surface of the infrared ray filter.

In another aspect of the invention, there is also provided a method for removing fine particles from an image sensor and infrared ray filter of a portable camera module having a CMOS center and an infrared filter, the method comprising the steps of: attaching a surface protective tape onto a surface of the infrared ray filter by using a tape attaching device after mechanically processing the infrared ray filter through a COF process in order to prevent fine particles from being attached to the surface of the infrared ray filter; attaching an FPCB to the infrared ray filter; performing a first heat treatment at a high temperature; detaching the surface protective tape having fine particles from the surface of the infrared ray filter by downwardly moving a tape detaching device positioned above the surface protective tape such that the tape detaching device sucks the surface protective tape by using vacuum pressure, and then upwardly moving the tape detaching device to detach the surface protective tape from the surface of the infrared ray filter; and measuring an image of the portable camera module having the image sensor and the infrared ray filter.

BRIEF DESCRIPTION OF THE DRAWINGS

The above advantages of the present invention will become more apparent from the following detailed description taken in conjunction with the accompanying drawings, in which.

DETAILED DESCRIPTION OF THE INVENTION

Figure 1:
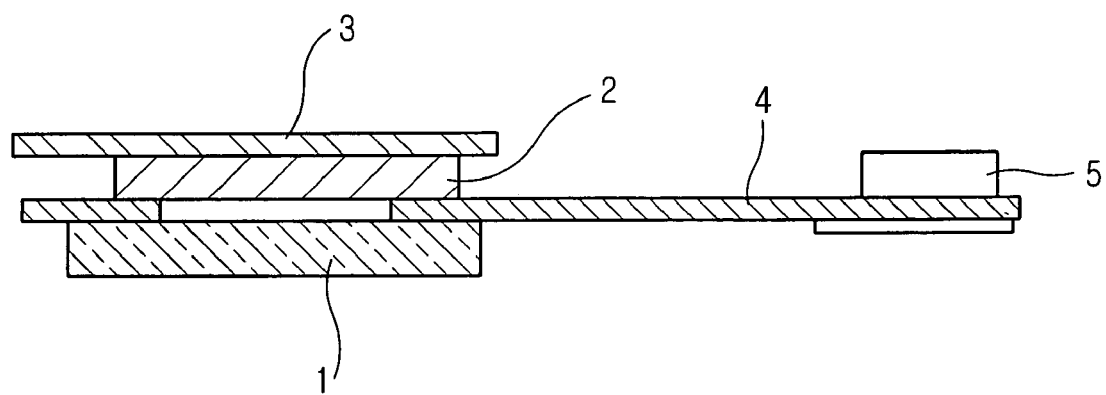
FIG. 1 is a side sectional view showing a surface protective tape attached to an infrared ray filter of a conventional camera lens module.
Figure 2:
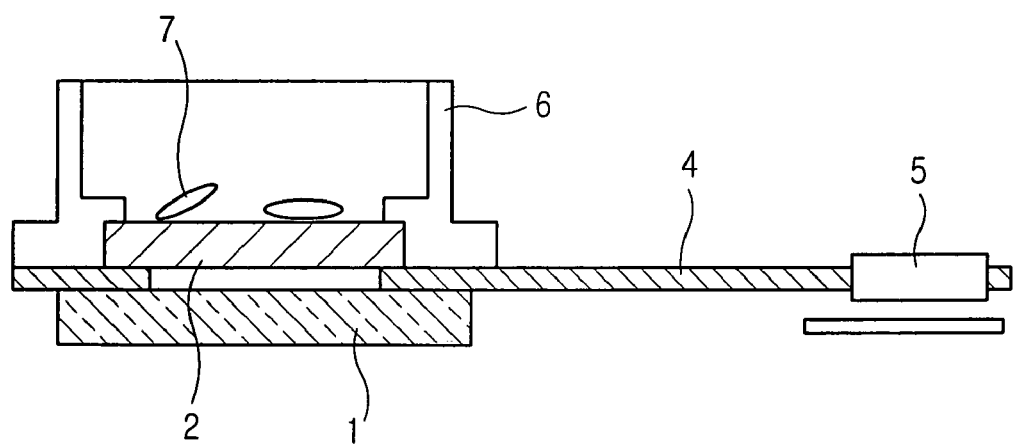
FIG. 2 is a side sectional view showing a conventional camera lens module, in which a surface protective tape is removed and a holder is attached thereto.
Figure 3:
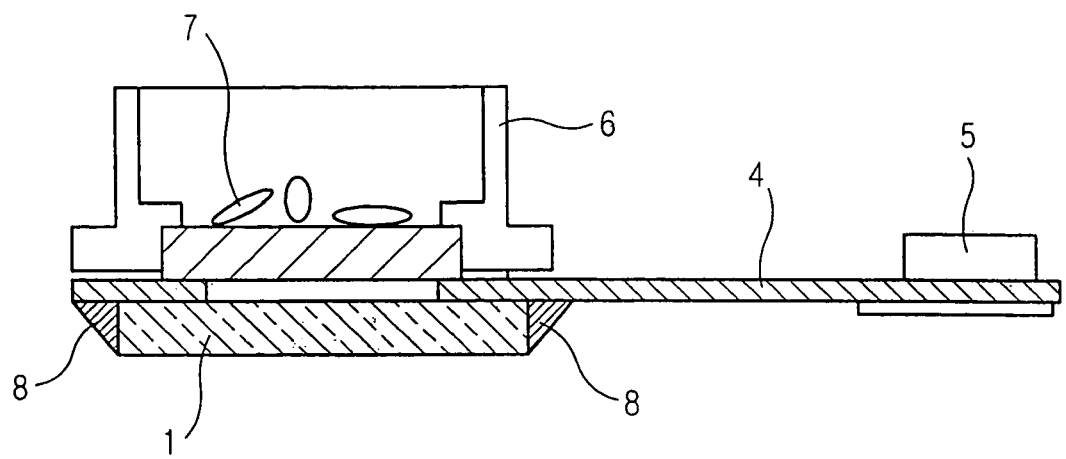
FIG. 3 is a side sectional view showing a conventional camera lens module, in which fine particles are attached to an infrared ray filter.

Hereinafter, several aspects of the present invention will be described with reference to the accompanying drawings. In the following description of the present invention, the same reference numerals are used to designate the same or similar components. It will be understood by those skilled in the art that the present invention is not limited to specific elements, such as circuit devices, described in the following description. For the purposes of clarity and simplicity, a detailed description of known functions and configurations incorporated herein will be omitted as it may obscure the subject matter of the present invention.

Figure 4:
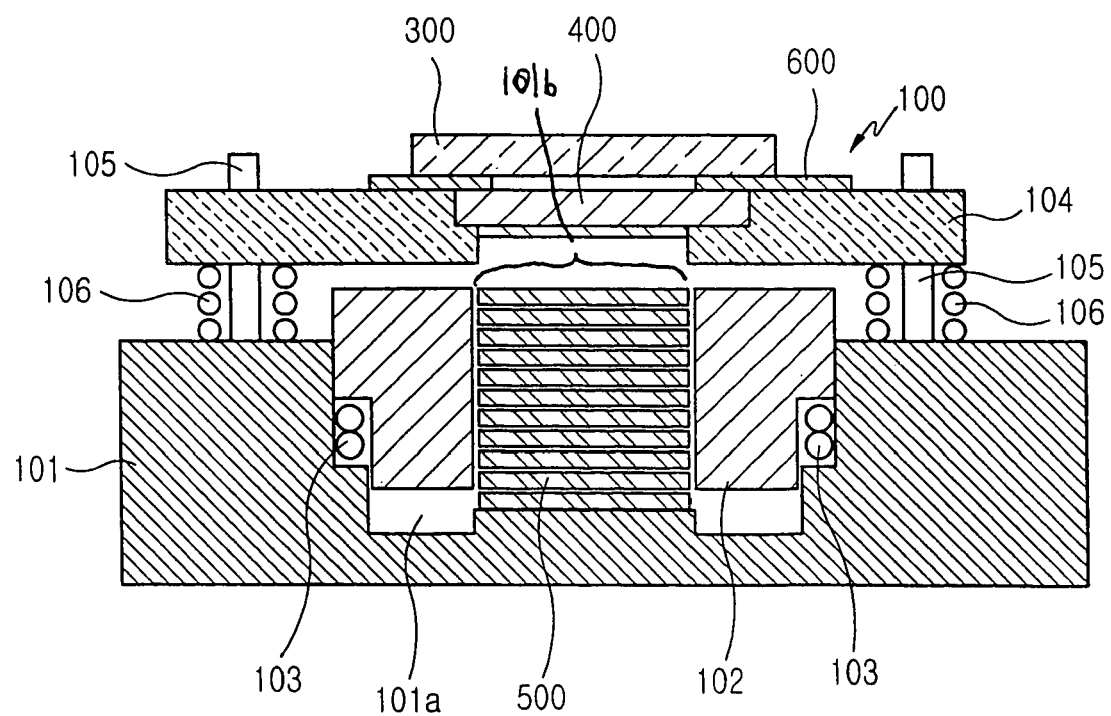
FIG. 4 is a side sectional view showing a tape attaching device of a fine particle removing apparatus for a portable camera module according to one aspect of the present invention.
Figure 5:
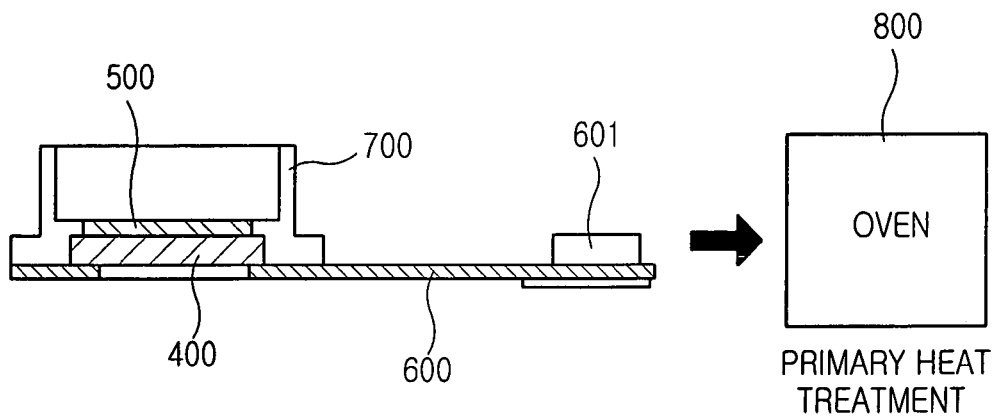
FIG. 5 is a side sectional view showing a primary heat-treatment process, in which a surface protective tape is attached to an infrared ray filter of a fine particle removing apparatus for a portable camera module according to another aspect of the present invention.
Figure 6:
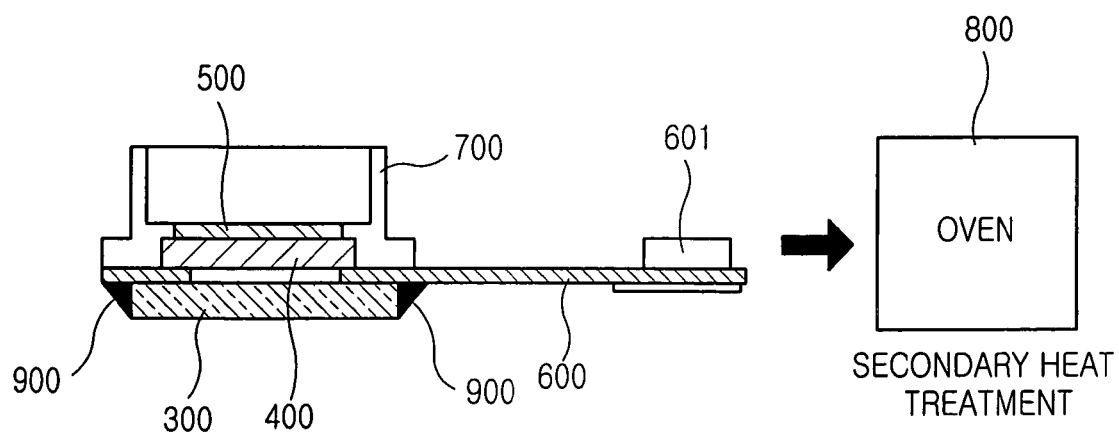
FIG. 6 is a side sectional view showing a secondary heat-treatment process, in which a surface protective tape is attached to an infrared ray filter of a fine particle removing apparatus for a portable camera module according to yet another aspect of the present invention.
Figure 7:
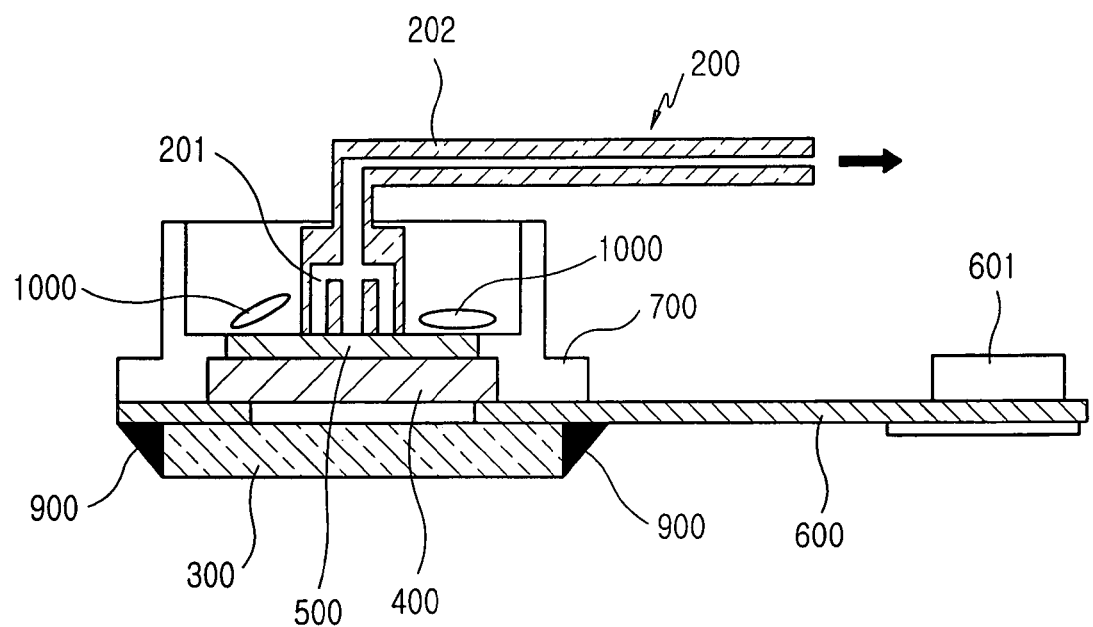
FIG. 7 is a side sectional view showing a tape detaching device of a fine particle removing apparatus for a portable camera module of yet another aspect of the present invention.

As shown in FIGS. 4 to 8, a fine particle removing apparatus for a portable camera module includes a tape attaching device 100 (FIG. 4) and a tape detaching device 200 (FIG. 7). The portable mobile camera module includes a CMOS image sensor 300 and an infrared ray filter 400. The CMOS image sensor 300 is aligned below the infrared ray filter 400 when viewed in the orientation shown in FIG. 6. The module shown in FIG. 4 is upside down to facilitate the attachment of tape 500 onto the filter 400 using the tape attaching device.

The tape attaching device 100 attaches a surface protective tape 500 on a surface of the infrared ray filter 400 in order to prevent fine particles 100 from being attached to the surface of the infrared ray filter 400.

In addition, the tape attaching device 100 includes a mounting plate 101, a center slider 102, first and second springs 103 and 106, a top slide plate 104, and a guide post 105. The mounting plate 101 is formed with a center hole 101a for receiving the center slider 102 therein. A plurality of surface protective tapes 500 are vertically stacked in a center hole 101b of the center slider 102, which is moved up and down in the center hole 101a of the mounting plate 101.

The first spring 103 is positioned between the mounting plate 101 and the center slider 102 so as to elastically support the center slider 102 in such a manner that the center slider 102 is moved up and down. The top slide plate 104 is positioned above the mounting plate 101 so as to guide the infrared ray filter 400 towards a center portion of the top slide plate 104 such that the infrared ray filter 400 is mounted on the center portion of the top slide plate 104. The guide post 105 is positioned between the top slide plate 104 and the mounting plate 101 in order to guide the up/down movement of the top slide plate 104. The second spring 106 is arranged around the guide post 105 in such a manner that the top slide plate 104 is elastically moved up and down.

In this state, a holder attaching process is carried out for the CMOS image sensor 300 and the infrared ray filter 400. Then, a primary heat treatment, an under filling process, and a secondary heat treatment are all sequentially carried out.

Figure 8:
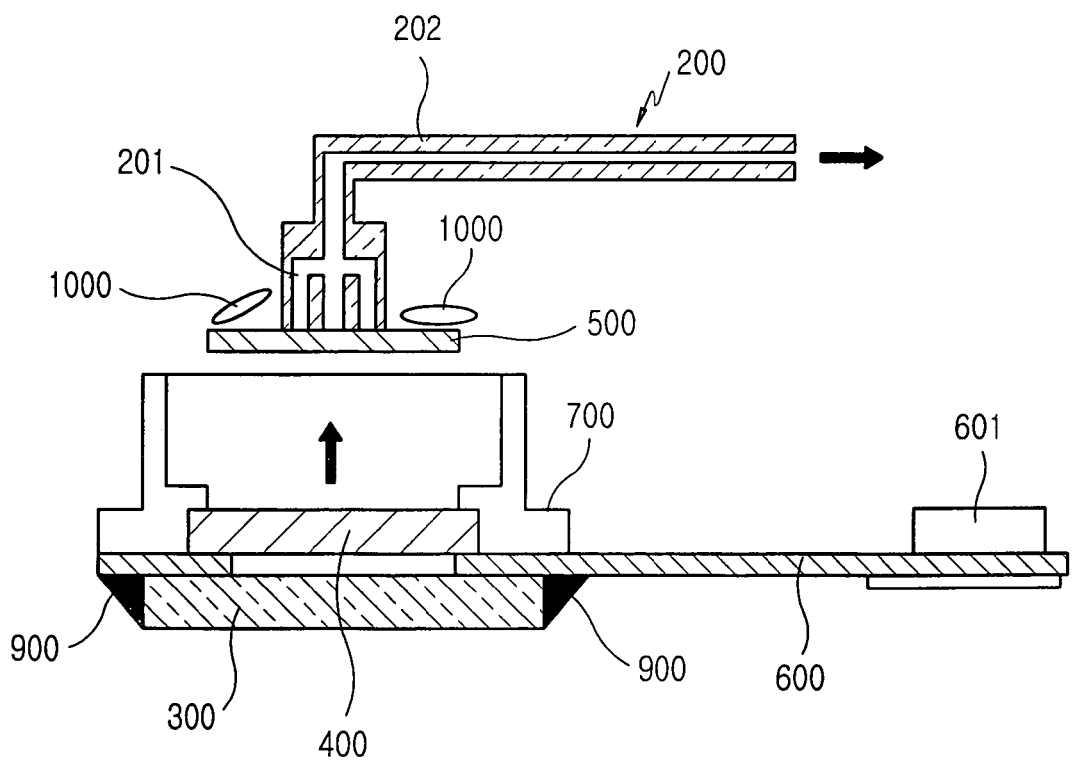
FIG. 8 is a side sectional view showing a process for detaching a surface protective tape having fine particles from an infrared ray filter by using a tape detaching device of a fine particle removing apparatus for a portable camera module according to still another aspect of the present invention.

After the aforementioned processes are performed, as shown in FIGS. 7 and 8, the tape detaching device 200 is moved up and down at an upper portion of the surface protective tape 500 for detaching the surface protective tape 500 from a surface of the infrared ray filter 400 by sucking a surface of the surface protective tape 500 using vacuum sufficient to overcome the adhesive bond of the tape 500 on the surface of the infrared filter 400.

The tape detaching device 200 includes an air nozzle 201 and an air line 202. The air nozzle 201 is positioned above the surface protective tape 500. When the air nozzle 201 moves down, the air nozzle 201 makes contact with the surface protective tape 500 and sucks the surface protective tape 500 by using vacuum sufficient to overcome the adhesive bond of the tape 500 on the surface of the filter 400. The air line 202 is connected to the air nozzle 201 in order to supply vacuum to the air nozzle 201.

Hereinafter, an operation of the fine particle removing device for the portable camera module according to yet another aspect of the present invention will be described in detail with reference to FIGS. 4 to 8.

As shown in FIG. 4, the portable camera module includes the infrared ray filter 400 and the CMOS image sensor 300.

The center hole 101a is formed at a center of the mounting plate 101 of the tape attaching device 100 through a COF (chip-on-film) process. The center slider 102, which is provided at a center thereof with surface protective tapes 500, is installed in the center hole 101a of the mounting plate 101.

In this state, the infrared ray filter 400 is mounted on the center of the top slide plate 104 of the tape attaching device 100.

Then, when a worker pushes the infrared ray filter 400 downward, the top slide plate 104 is moves downward so that the surface protective tape 500 is attached to a center of the infrared ray filter 400.

At this time, the first spring 103 positioned between the mounting plate 101 and the center slider 102 allows the center slider 102 to be moved up and down elastically.

The guide post 105 is positioned between the top slide plate 104 and the mounting plate 101 in order to guide the up/down movement of the top slide plate 104.

In addition, the second spring 106 is arranged around the guide post 105 in order to elastically support the top slide plate 104 in such a manner that the top slide plate 104 can be moved up and down. The springs will automatically push the infrared filter 400 upward after being pushed downward. That is, after the infrared ray filter 400 has been mechanically processed, the surface protective tape 500 is attached to the surface of the infrared ray filter 400 using the tape attaching device 100 in order to prevent fine particles 1000 (shown in FIG. 7) from being attached to the surface of the infrared ray filter 400.

In this state, the holder attaching process is carried out. Then, adhesive is applied to a contact surface of the infrared ray filter 400 and a contact surface of an FPCB 600, which is provided at an upper surface thereof with a connector 601, in order to attach the FPCB 600 to the infrared ray 400. Then, the contact surface of the infrared ray filter 400 is bonded to the contact surface of the FPCB 600.

A holder 700 is attached to the contact surface of the FPCB 600 in such a manner that the infrared ray filter 400 is arranged within the holder 700. Then, the primary heat treatment is carried out in an oven 800 at a high temperature. After that, the image sensor 300 is attached to an underside of the FPCB 600 and an under filling process is carried out with respect to both sides of the image sensor 300 in order to prevent the image sensor 300 from being separated from the FPCB 600. Then, a secondary heat treatment is carried out in the oven 800 at a high temperature.

In this state, as shown in FIG. 7, the air nozzle 201 of the tape detaching device 200 positioned above the surface protective tape 500 is moved downward so as to make contact with the surface protective tape 500 having fine particles 1000.

Then, vacuum is supplied into the air nozzle 201 through the air line 202 connected to the air nozzle 201 so as to allow the air nozzle 201 to suck the surface protective tape 500.

Accordingly, when the tape detaching device 200 moves up, the surface protective tape 500 having fine particles 1000 is also moved up together with the air nozzle 201 so that the surface protective tape 500 is separated from the surface of the infrared ray filter 400 as shown in FIG. 8.

Figure 9:
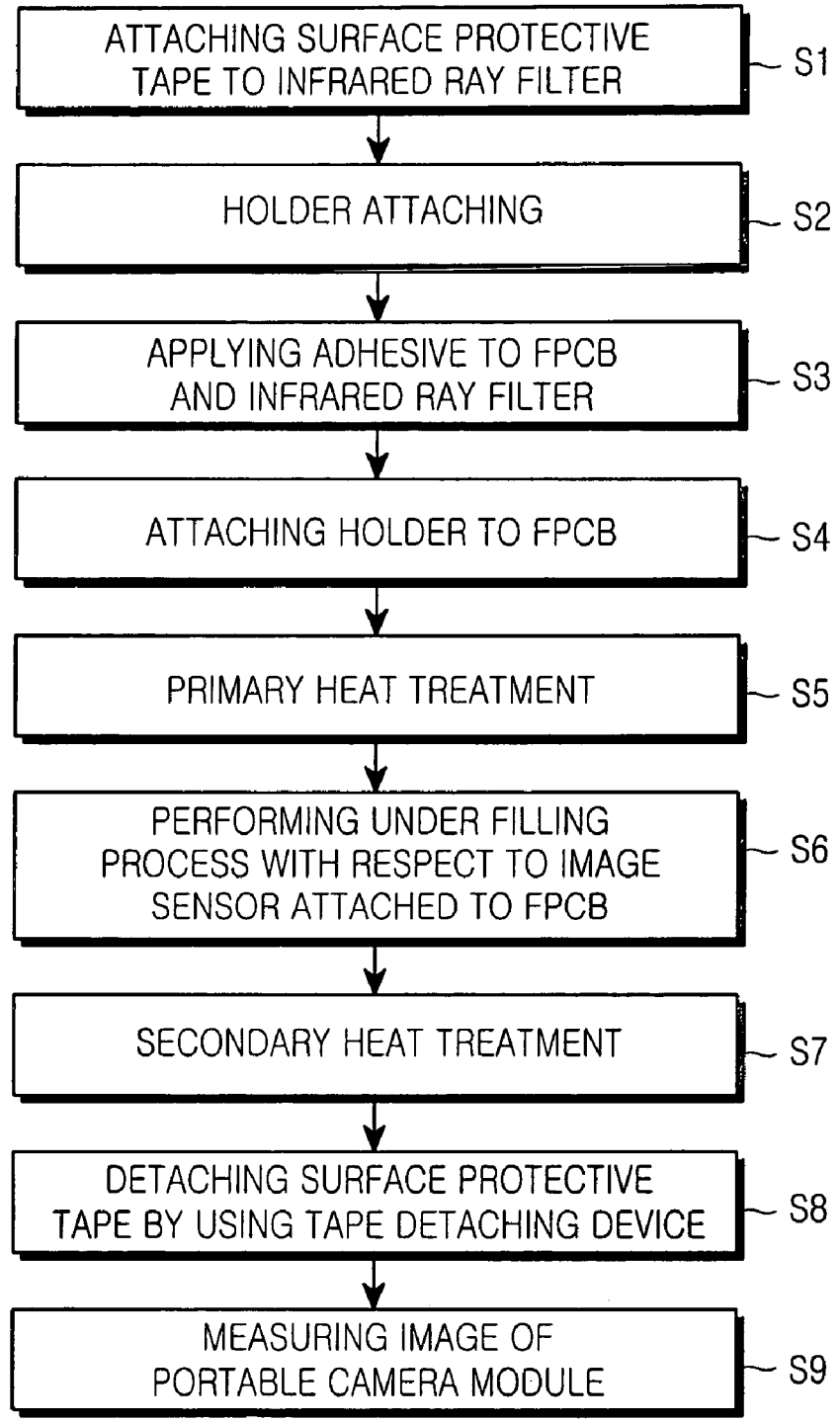
FIG. 9 is a block view showing a method of removing fine particles for a portable camera module according to another aspect of the present invention.

Hereinafter, a method of removing fine particles for the portable camera module according to another aspect of the present invention will be described with reference to FIG. 9.

As described above, the portable camera module includes the CMOS image sensor 300 and the infrared ray filter 400.

After the infrared ray filter 400 has been mechanically processed through the COF process, the surface protective tape is attached to the surface of the infrared ray filter 400 in order to prevent fine particles 1000 form being attached to the surface of the infrared ray filter 400 (S1).

Then, the holder attaching process is carried out (S2).

After that, adhesive is applied to the contact surfaces of the infrared ray filter 400 and the FPCB 600 in order to attach the FPCB 600 to the infrared ray filter 400 (S3).

Then, the contact surface of the infrared ray filter 400 is bonded to the contact surface of the FPCB 600 and the holder 700 is attached to the contact surface of the FPCB 600 in such a manner that the infrared ray filter 400 is accommodated in the holder 700 (S4).

Next, the primary heat treatment is carried out in the oven 800 at the high temperature (S5).

After that, the image sensor 300 is attached to the underside of the FPCB 600 and the under filling process is carried out with respect to both sides of the image sensor 300 in order to prevent the image sensor 300 from being separated from the FPCB 600 (S6).

Then, the secondary heat treatment is carried out in the oven 800 at the high temperature (S7).

After that, the air nozzle 201 of the tape detaching device 200 positioned above the surface protective tape 500 is downwardly moved so as to make contact with the surface protective tape 500 having fine particles 1000.

In this state, vacuum is supplied to the air nozzle 201 through the air line 202 so that the surface protective tape 500 is separated from the infrared ray filter 400 as the tape detaching device 200 moves up (S8).

Then, the image achieved by the camera module having the image sensor 300 and the infrared ray filter 400 is measured (S9).

Table 1 shows an amount of fine particles attached to the infrared ray filter in various process steps of the camera module fabricating process depending on the surface protective tape.

TABLE 1

|  | Holder attaching | Primary heat treatment | Under filling | Secondary heat treatment | Fault rate |
|---|---|---|---|---|---|
| Amount of particles without surface protective tape | 16 ea | 4 ea | 15 ea | 5 ea | 20% |
| Amount of particles with surface protective tape | 0 | 0 | 0 | 0 | 0 |

While the present invention has been shown and described with reference to certain preferred aspects thereof, it will be understood by those skilled in the art that various changes in form and details may be made therein without departing from the spirit and scope of the invention as defined by the appended claims.

What is claimed is:

1. An apparatus for removing fine particles during fabrication of a portable camera module comprising an image sensor and an infrared ray filter, the apparatus comprising:
a tape attaching device adapted for attaching a surface protective tape on a surface of the infrared ray filter so as to prevent fine particles from being attached to the surface of the infrared ray filter, the tape attaching device comprising a mounting plate; a slide plate being configured to hold infrared ray filter and being configured for a vertical movement; and a center slider having a center hole that contains at least one surface protective tape, being interposed between the mounting plate and the slide plate, being configured for the vertical movement; and
a tape detaching device adapted for detaching the surface protective tape arranged on the surface of the infrared ray filter, said tape detaching device being movably installed above the surface protective tape in order to detach the surface protective tape.

2. The apparatus as claimed in claim 1, further comprising a tape detaching device adapted for detaching the surface protective tape arranged on the surface of the infrared ray filter, said tape detaching device being movably installed above the surface protective tape in order to detach the surface protective tape.

3. The apparatus as claimed in claim 1, wherein said tape attaching device has a device mounting position and a tape attaching position.

4. The apparatus as claimed in claim 3, further comprising springs to bias the slide plate upward to the mounting position.

5. The apparatus as claimed in claim 4, wherein the slide plate is pushed downward to the tape attaching position to attach surface protective tape to the infrared ray filter.

6. The apparatus as claimed in claim 2, wherein the tape detaching device is adapted for downward movement and comprises a first position adapted for attachment of an air nozzle to the surface protective tape on said infrared ray filter.

7. The apparatus as claimed in claim 6, wherein the tape detaching device is also adapted for upward movement and comprises a second position where in the air nozzle moves upward relative to the first position to detach the tape.

8. The apparatus as claimed in claim 7, wherein a vacuum is supplied to one end of the air nozzle so that the nozzle remains attached to the surface protective tape via the vacuum to hold onto the surface protective tape as it is detached from the infrared ray filter.

9. The apparatus as claimed in claim 8, wherein the surface protective tape is adapted for being attached to the infrared ray filter during attachment of a device holder.

10. The apparatus as claimed in claim 9, wherein the surface protective tape is adapted for being attached to the infrared ray filter during a primary heating treatment.

11. The apparatus as claimed in claim 10, wherein the surface protective tape is adapted for being attached to the infrared ray filter during a secondary heating treatment.

12. The apparatus as claimed in claim 10, wherein the surface protective tape is adapted for being attached while under filling processes are being carried out after the secondary heat treatment.

13. The apparatus as recited in claim 7, wherein a vacuum is applied as the device moves from the first position to the second position.

14. The apparatus as claimed in claim 1, wherein the tape attaching device further comprises a first spring being positioned between the mounting plate and the center slider and being configured to elastically support the center slider such that the center slider moves up and down, and wherein the slide plate is configured to guide the infrared filter such that the surface protective tape is mounted on the infrared filter.

15. The apparatus as claimed in claim 14, further comprising: a guide post installed between the slide plate and the mounting plate in order to guide an up/down movement of the slide plate, and a second spring arranged around the guide post, the second spring configured to elastically support the slide plate such that the slide plate moves up and down.

16. The apparatus according to claim 15, wherein said tape attaching device contains a plurality of the surface protective tapes stacked in an vertical direction of the center slider.

17. The apparatus according to claim 2, wherein the tape detaching device includes an air nozzle that is installed above the surface protective tape and that is configured to be attached to the surface protective tape using vacuum, and an air line connected to the air nozzle so as to supply vacuum to the air nozzle.

18. The apparatus according to claim 1, wherein the center slider is configured to contain a plurality of the surface protective tapes in the center hole.

* * * * *

UNITED STATES PATENT AND TRADEMARK OFFICE
CERTIFICATE OF CORRECTION

PATENT NO.       : 7,247,176 B2                                          Page 1 of 1
APPLICATION NO.  : 10/835635
DATED            : July 24, 2007
INVENTOR(S)      : Hyun-Ju Lee et al.

It is certified that error appears in the above-identified patent and that said Letters Patent is hereby corrected as shown below:

Title Page
Item [54], title, should read as follows:

--APPARATUS FOR ATTACHING AND DETACHING A PROTECTIVE TAPE.--

Signed and Sealed this

Twenty-fifth Day of September, 2007

JON W. DUDAS
*Director of the United States Patent and Trademark Office*